Patented Nov. 7, 1939

2,178,961

UNITED STATES PATENT OFFICE 2,178,961

LUMINOUS AND RADIOACTIVE COMPOUND

Raymond W. Gear, Plymouth, Ind.

No Drawing. Application April 1, 1938,
Serial No. 199,442

3 Claims. (Cl. 134—47)

The present invention relates in general to chemical compounds and more particularly to chemical compounds having luminous and radioactive properties. Compounds of this type are used in luminous paints, which, when applied to material to be made luminous, easily scale and peel off.

The principal object of the present invention is to provide a luminous and radioactive chemical compound which can more readily and easily be applied to the material to be made luminous and which readily and easily penetrates into, impregnates and saturates material such as cloth, paper, wood and other porous or fibrous materials.

Another object of the invention is a new and practical process for making a luminous and radioactive chemical compound which may readily and easily be applied to porous and fibrous material and which will readily penetrate, impregnate and saturate such material.

In carrying out my invention I employ as chief ingredients thorium nitrate, sodium nitrate, saltpeter and calcium sulphide, which ingredients, when mixed with each other and sulphur flour and precipitated by the use of alcohol and ammonia, as will be hereinafter described, produce a luminous, radio-active compound of the type desired.

Excellent and best results are obtained when the compound is made up in the following successive steps and quantities of the chief ingredients.

First: Four ounces of dry thorium nitrate are thoroughly mixed with four ounces of flour of sulphur and one-fourth ounce of dry sodium nitrate and this mixture is precipitated with alcohol denatured by formaldehyde and then dried so as to produce activated sulphides, the resulting mixture being hereinafter referred to as I.

Second: Eight ounces of saltpeter and four ounces of flour of sulphur are thoroughly mixed with each other and the resulting mixture is precipitated with one-fourth ounce of concentrated ammonia to produce a nitrosulphate. The precipitated nitrosulphate after drying is mixed with compound I referred to above by precipitation, the resulting mixture being hereinafter referred to as II.

Third: Mixture II is now thoroughly mixed with eighty ounces of a standard luminous calcium sulphide and the resulting compound mixture III is dissolved in a vehicle composed of linseed oil and gum arabic, which vehicle is made up by dissolving one pound of gum arabic in one gallon of highly boiling linseed oil by heat and vigorous agitation. Preferably 40 parts of the vehicle and 60 parts of the compound mixture III are chosen for a utility solution having luminous properties. The vehicle and the compound mixture III are mixed to an emulsion and finally ground in a color or pebble mill. The necessary thinning of the solution may readily be obtained by benzene which is used as a filler, and also may readily and properly be colored by the use of aromatic pigments which must be carefully selected so as not to have heavy metal properties.

The steps defined under paragraphs "first" and "second" may materially be improved when the flour of sulphur is omitted and the compound mixtures are based in a sulphur solution, which method produces larger quantities of activated sulphides, particularly, when made under vacuum.

The finished compound solution readily enters into the pores of porous material, encircles the fibers of fibrous material and penetrates into the pores thereof, particularly, when applied under pressure.

The described solution may directly be sprayed upon material at pressures of approximately 50 lbs. and readily penetrates and impregnates the material in a manner closely resembling dyeing of said material.

Having thus described my invention, what I claim is:

1. In a method of making a luminous compound the steps of adding concentrated ammonia to a mixture of sulphur and saltpeter for precipitation of a nitrosulphate, adding to this nitrosulphate by precipitation activated sulphides obtained by precipitation with alcohol from a mixture of thorium nitrate, sodium nitrate and sulphur and while thoroughly mixing the resulting compound mixture adding luminous calcium sulphide.

2. In a method of making a luminous compound the steps of adding one-fourth ounce of concentrated ammonia to a mixture of eight ounces of saltpeter and eight ounces of sulphur for precipitation of a nitrosulphate, adding to the nitrosulphate activated sulphides obtained by precipitation with alcohol from a mixture of eight ounces of sulphur, four ounces of thorium nitrate and one-fourth ounce of sodium nitrate, and while thoroughly mixing the resulting compound mixture adding luminous calcium sulphide.

3. In a method of making a luminous compound the steps of adding one-fourth ounce of concentrated ammonia to a mixture of eight ounces of saltpeter and eight ounces of sulphur for preciptation of a nitrosulphate, adding to the nitrosulphate after drying activated sulphides obtained by precipitation with alcohol from a mixture of eight ounces of sulphur, four ounces of thorium nitrate and one-fourth ounce of sodium nitrate, and while thoroughly mixing the resulting compound mixture adding eighty ounces of a luminous calcium sulphide.

RAYMOND W. GEAR.